United States Patent [19]

Minuhin et al.

[11] Patent Number: 4,760,472

[45] Date of Patent: Jul. 26, 1988

[54] DUAL CHANNEL READBACK RECOVERY SYSTEM

[75] Inventors: Vadim B. Minuhin, Bloomington; Robert E. Caddy, Jr., Minneapolis, both of Minn.

[73] Assignee: Magnetic Peripherals Inc., Minneapolis, Minn.

[21] Appl. No.: 11,973

[22] Filed: Feb. 6, 1987

[51] Int. Cl.⁴ .............................................. G11B 5/09
[52] U.S. Cl. ......................................... 360/46; 360/51
[58] Field of Search ........................ 360/45, 46, 51, 67

[56] References Cited

U.S. PATENT DOCUMENTS 4,081,756 3/1978 Price et al. .............................. 360/45

Primary Examiner—Vincent P. Canney
Attorney, Agent, or Firm—R. M. Angus; J. A. Genovese

[57] ABSTRACT

A dual channel readback recovery circuit includes a high resolution channel and a low resolution channel and a data latch. A logical filter in one or both channels rejects signals that are followed by other signals if they are spaced apart less than the rejection time interval allowed by the code used. Polarity qualifying logic rejects signals in the channel that are not matched in polarity.

16 Claims, 6 Drawing Sheets

DUAL CHANNEL READBACK RECOVERY SYSTEM

This invention relates to digital magnetic recording, and more particularly to a signal recovery technique useful for reading high density digital magnetic recordings.

The signal read from a digital magnetic recording in most storage systems is ordinarily a summation of individual pulses and is generally characterized by a somewhat bell-shaped or sinusoidal-shaped pattern. The peak of each individual pulse is generally coincident with a transition of magnetic orientation on the moving magnetic media, which in turn is representative of the value of encoded digital bits. For example, a transition of magnetic orientation may occur for each "1" bit, whereas the absence of a transition is indicative of a "0" digital bit. The principal problem in the recovery of recorded information consists of detection and accurate location of the position of each individual peak. Ordinarily, a phased locked oscillator generates a series of clock signals from the pulse peaks of the read signal to establish a sequence of detection windows for reading encoded bits. Thus, a peak detected during the presence of a window indicates the digital bit value of "1", whereas the absence of a peak during a detection window indicates a binary value of "0".

Most prior systems employ a single channel system to detect peak positions by linearly filtering the readback signal to create a waveform with symmetric peaks. High frequency noise is rejected by band-limiting the signal. However, such systems cannot reduce intersymbol interference without decreasing the signal-to-noise ratio.

A dual channel recovery scheme is described in U.S. Pat. No. 4,517,610 a "Multichannel Signal Recovery Circuit" by V. B. Minuhin and assigned to the same assignee as the present invention. That system independently achieves reduction of intersymbol interference in the high resolution channel filter and good noise rejection in the low resolution channel filter. The high resolution filter provides accurate timing by boosting the high frequency content of the signal while the output of the low resolution filter provides a validation signal. By choosing an appropriate delay between the two channels, the two signals can be matched and the data latch rejects the noise-induced false crossings in the high resolution channel. The data latch is toggled by the crossover pulse of the high resolution channel following the corresponding crossover in the low resolution channel.

In addition to providing a high resolution channel which can tolerate more noise, the dual channel scheme is relatively insensitive to changes in the signal amplitude because it does not depend on a threshold detection. This feature relaxes the requirements on signal modulation due to flying height variations, media defects and media non-uniformity. Utilizing an adjustable delay line in one of the channels, it is possible to bring the two channels into optimal signal synchronization.

One problem in prior dual channel recovery circuits is the necessity to provide a very tight delay matching for different data pattern and different track radius of the magnetic disc. This problem is made difficult by the fact that signals from different track radii of the magnetic disc are substantially different. The filters in the channels must accommodate this difference. In prior dual channel circuits, efforts to improve performance were directed toward improvement of delay matching between the channels and attempted to seek "average" delay matching without correcting delays for individual bit patterns to be recovered nor for signals from different track radii.

The present invention provides a dual channel recovery circuit which is insensitive to tight delay matching between the channels. Hence, the circuit insensitive to the changes of the channel responses as the head moves from track to track along the disc radius.

It is an object of the present invention to provide a dual channel readback recovery circuit that is insensitive to tight delay matching between the channels.

Another object is to provide a dual channel readback recovery system which is insensitive to changes in track position or radius.

In accordance with the present invention, a dual channel readback recovery circuit is provided with a logical filter in the data latch to reject false crossovers that are spaced apart less than the minimal distance between written ones allowed by the code used. Polarity validation logic rejects false signals on the basis of improper polarity matching between signals in the channels of the data latch. The logical filter and validation logic prevents certain false signals from being detected as true data.

One feature of the present invention resides in the fact that the dual channel readback recovery circuit is insensitive to the delay matching between the channels, and to the changes in the channel responses as the head moves along disc radius.

Another feature of the present invention resides in the adaptation of all delays and the logical filter rejection interval to the reference clock signal which is derived from the system phase locked loop.

Still another feature of the present invention resides in the provision of an LSI (large scale integration) chip data latch with adaptation of all delays and the logical filters rejection intervals to a reference clock signal by using on-chip delay cells, thereby providing accurate control of environment and process tolerances.

The above and other features of this invention will be more fully understood from the following detailed description, and the accompanying drawings, in which:

FIG. 1 is a block diagram of a dual channel readback recovery circuit according to the presently preferred embodiment of the present invention;

FIG. 2 consisting of a through M is a timing diagram of signals at various points of the block diagram of FIG. 1;

Figure 6:
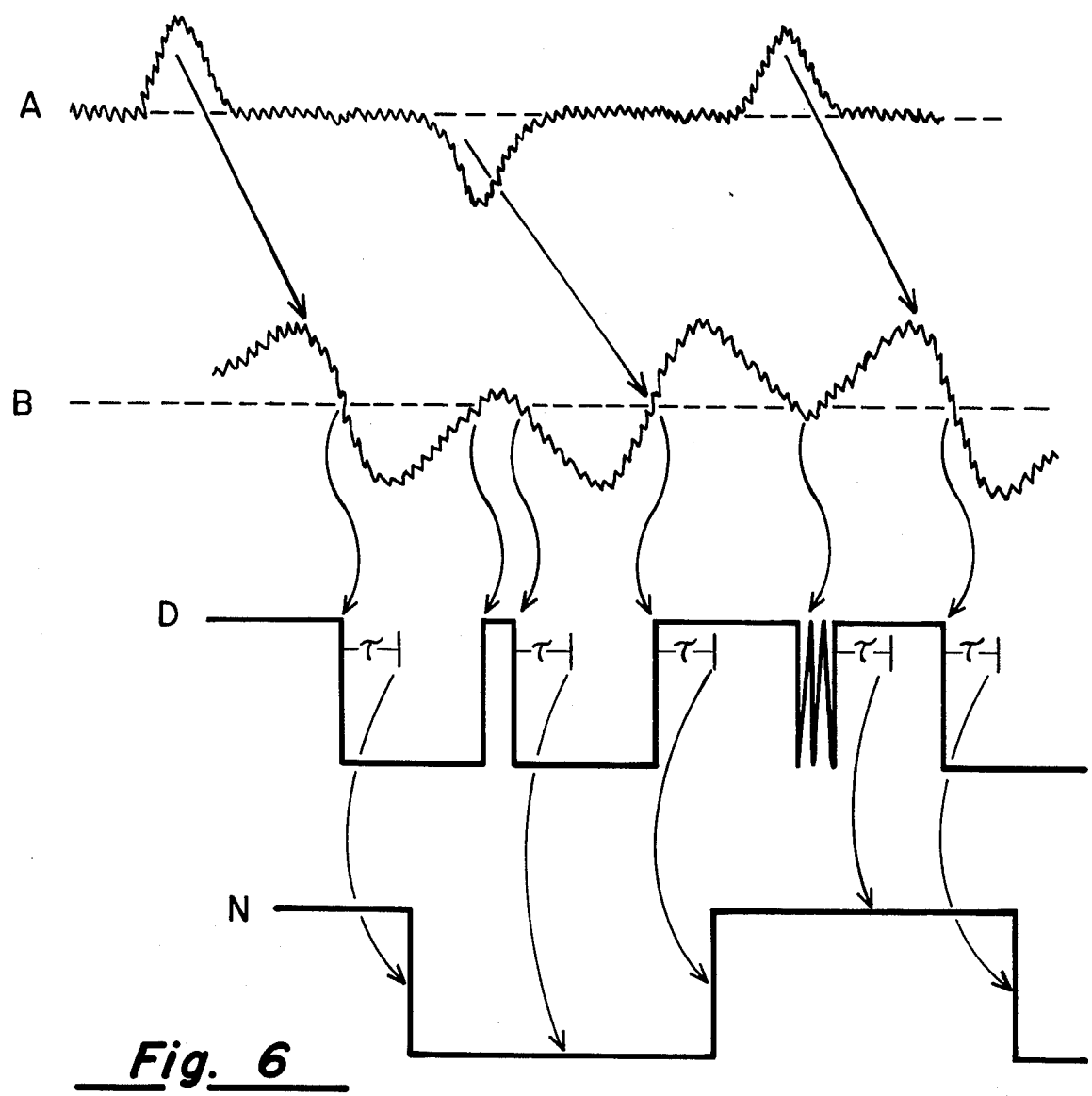
Figure 5:
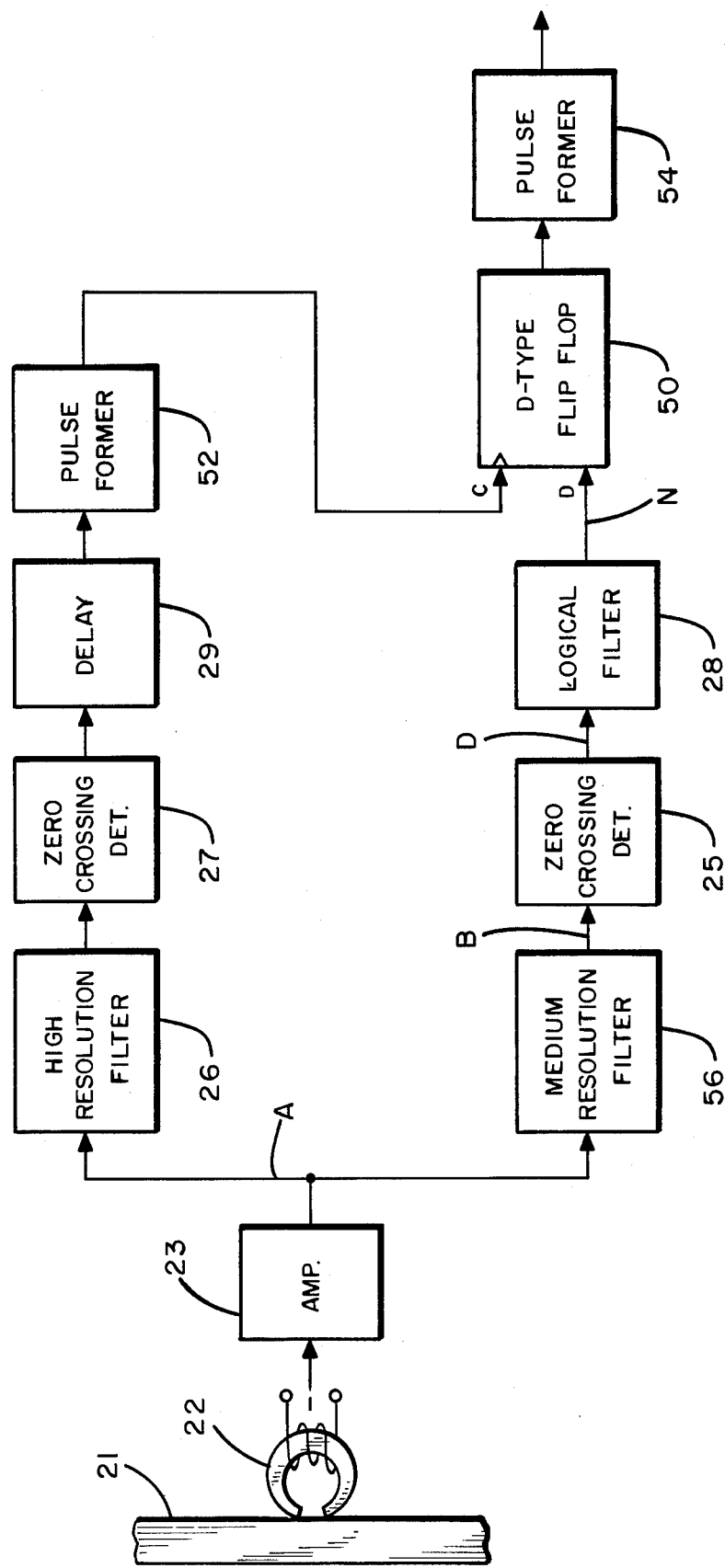
FIG. 5 is a block diagram of a dual channel readback recovery circuit according to a modification of the present invention.
Figure 7:
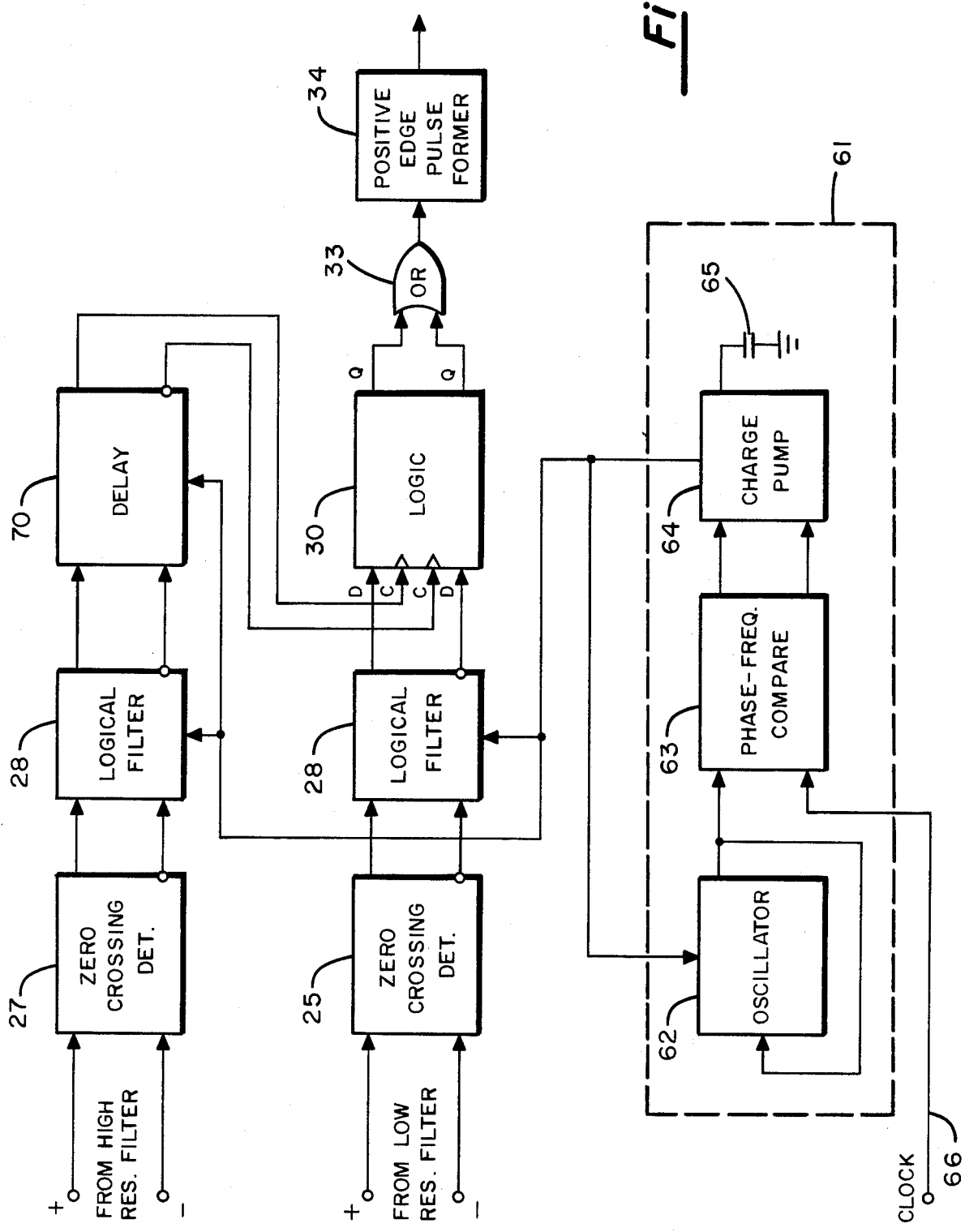

FIG. 6 A, B, D and W is a timing diagram of signals at various points of the diagram of FIG. 5; and FIG. 7 is a block diagram of a dual channel readback recovery system according to another modification of the present invention.

Figure 1:
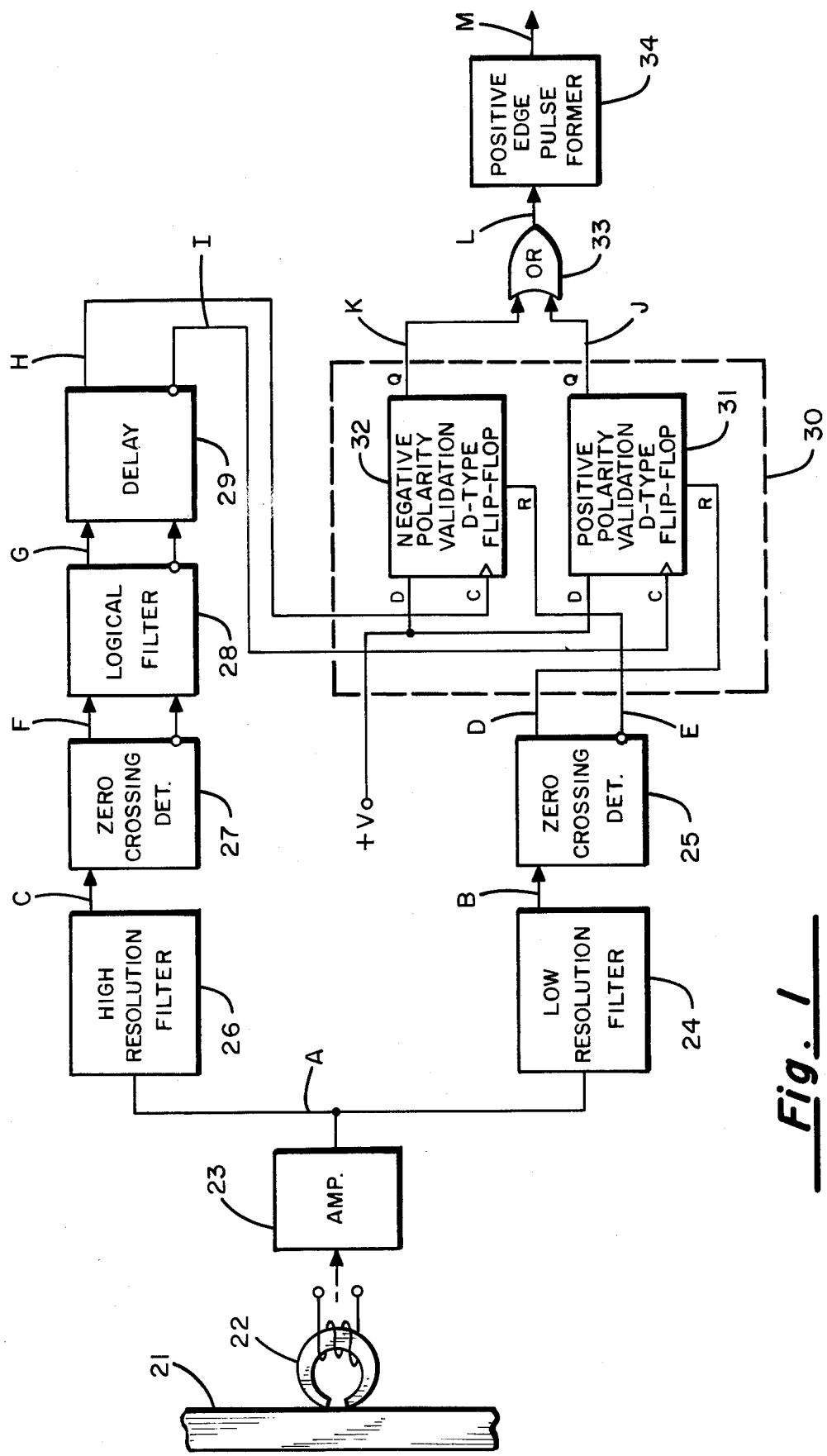
Figure 2:
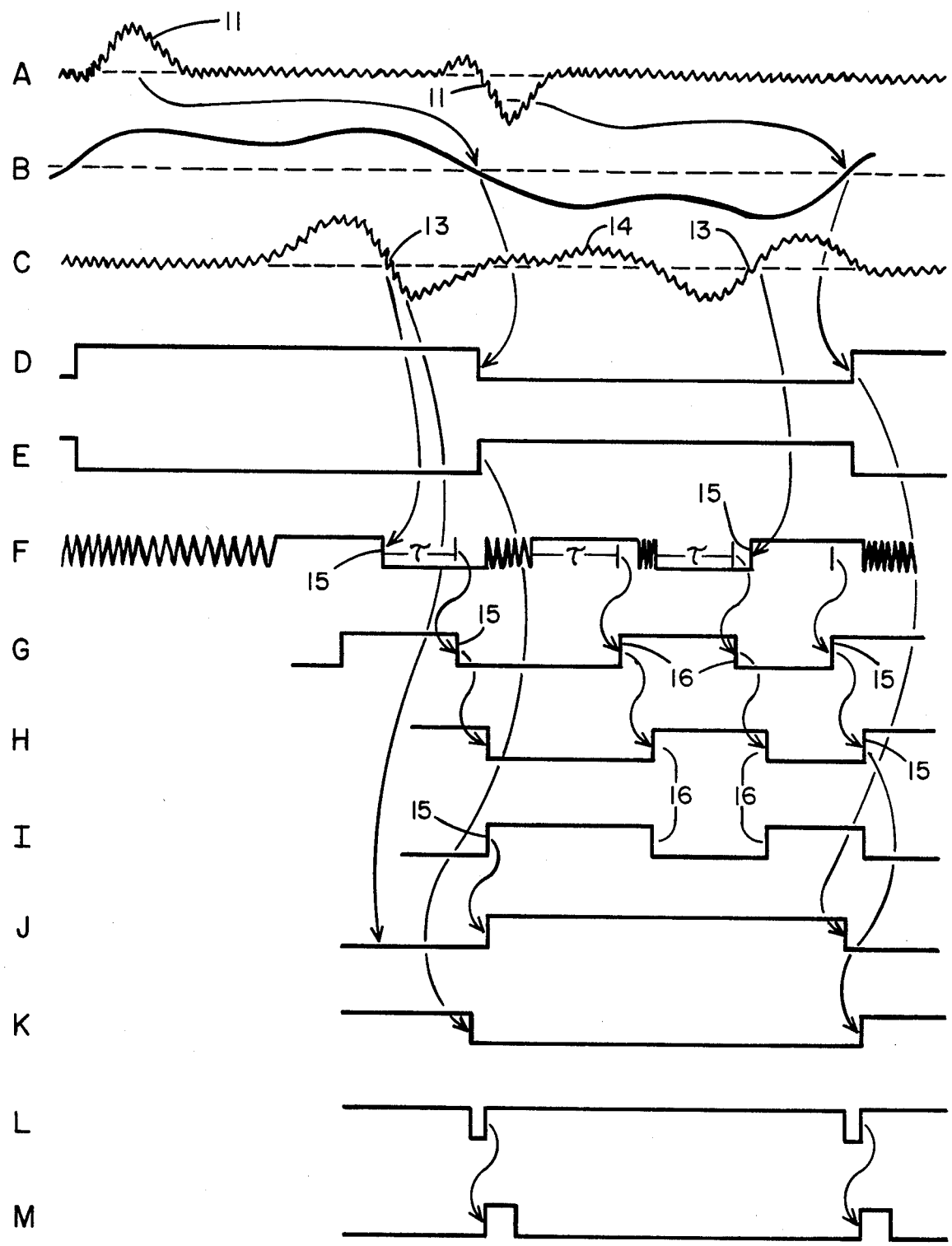

With reference to the drawings, and particularly to FIGS. 1 and 2, there is illustrated a dual channel signal recovery system in accordance with presently preferred embodiment of the present invention. A magnetic media or disk 21 is driven by a drive motor (not shown) past a read/write head 22 to read signals from the disk. Head 22 provides readback signals (waveform A in FIG. 2) to read amplifier 23 which provides read signals to the high and low resolution channels.

The waveform A illustrates a typical readback signal for recovery of (2,7) code signals for the case of maximal distance between recorded transitions in medium magnetization (7 zeros between ones). Individual transition peaks 11 represent recorded ones, and a considerable amount of noise is superimposed on the readback signal. (A (2,7) code is a known encoding technique wherein at least two, but not more than seven, zeros occur between successive ones, so transitions will occur at spacings between three and eight windows apart.)

The low resolution linear filter 24 converts transition peaks to extended low noise antisymmetric pulses (waveform B in FIG. 2) so that the zero cross-over points 12 in waveform B corresponds to the peaks 11 of waveform A. Intersymbol interference occurs in the low resolution filter so that the responses to individual transition peaks overlap and the output of the low resolution filter 24 only crosses zero level at the moments corresponding to peaks 11 in waveform A, which in turn correspond to transitions in the recorded signal. The output of low resolution filter 24 is supplied to zero crossing detector (comparator) 25 which provides complimentary reset signals (waveforms D and E in FIG. 2) to qualifying logic 30, operation of which will be described below. Due to intersymbol interference in the low resolution filter, accurate timing cannot be achieved from the low resolution channel. As will be explained below, the zero crossovers in the low resolution qualifying signals (waveforms D and E) can deviate up to ±1.5 detection windows (for 2,7 code) relative to their average positions. High resolution linear filter 26 converts transition peaks 11 of signal A to short antisymmetric pulses (waveform C in FIG. 2) having their zero crossover points 13 corresponding to the peaks of waveform A. In order to reduce intersymbol interference in the high resolution channel, high frequency components of readback signal are emphasized in the high resolution filter, resulting in a relatively low average signal/noise ratio. Noise and other undesirable signals 14 caused by nonideality of the filter response (leading and following tails) exist between true antisymmetric pulses at the output of the high resolution filter 26. However, the signal/noise ratio is adequate to detect desired true transitions. Output from the high resolution filter 26 is supplied to zero crossing detector (comparator) 27, which produces at its output (waveform F) the true crossovers 15 as well as random crossovers caused by the noise in the channel and by other undesirable signals. Signals from the output of zero crossing detector 27 are supplied to logical filter 28, to be described in detail below. Preferably, detector 27 provides the complementary output signals to filter 28, for purposes to be described below. Logical filter 28 only passes crossovers that are separated by more than a minimum time interval $\tau$, (shown in waveform F), which is the rejection interval of the filter. If a (2,7) code is used in the channel, the rejection interval, $\tau$, is chosen to be slightly less than the time interval of 2 detection windows (at least two zeros between encoded ones in (2,7) code). Logical filter 28 also delays the signal an amount slightly greater than the rejection interval of the filter resulting in waveform G. It should be noted that logical filter 28 alone does not eliminate all false crossovers in the high resolution channel. As shown in waveform G, the crossovers passed by logical filter 28, in general, can be comprised of true crossovers 15 as well as false crossovers 16. The false crossovers 16 result from undesirable signal 14 in waveform C.

Output from the logical filter 28 is supplied to the delay line 29, whose purpose is to bring signals in the two channels into proper time relationship. It should be noted that depending on signal propagation time in the low and high resolution filters, the delay line 29 may be located either in the high or in the low resolution channels of data latch. Delay line 29 has two complimentary outputs which provide two complimentary clocking signals (waveforms H and I) to logic 30.

Logic 30 is comprised of a positive polarity validation D-flip-flop 31 and a negative polarity validation D-flip-flop 32. The flip-flops work as validating flip-flops alternately. The two complimentary outputs of the low resolution zero crossing detector 25 provide two complimentary signals (waveforms D and E) to the overriding reset inputs of flip-flops 31 and 32, respectively. The two complimentary outputs of delay line 29 provide two complimentary clocking signals (waveforms H and I) to the clock inputs of flip-flops 31 and 32, respectively. A constant high level logical signal is provided to the D-inputs of both flip-flops 31 and 32. Flip-flops 31 and 32 produce waveforms J and K, respectively.

Each time the low resolution zero crossing detector 25 changes state, both flip-flops 31 and 32 will be forced to their low logical state. One of them will be forced low by the reset signal, the other will be in the low state because it was forced into that state previously. The flip-flop which was already low now has its reset condition removed, and will be clocked high by the next positive edge at its clock input. This next positive edge represents an encoded one. Thus, the flip-flop already low at the time of a reset from zero crossing detector 25 becomes the qualification flip-flop to detect transitions (ones) from delay line 29. The qualification flip-flop will remain in the high state and ignore any false signals 16, waveforms H and I, until next change in the state of low resolution comparator 25 to force the flip-flop low. The qualification flip-flop will ignore any negative edge at its clock input, thereby protecting against false signals in the high resolution channel which are not matched in the polarity to the signals in the low resolution channel. The positive pulses at the outputs of logic 30 are supplied to OR gate 33 to produce waveform L. Output of OR gate 33 is supplied to the positive edge pulse former 34 which generates short pulses (waveform M) representing the encoded ones of the recovered readback signal.

Figure 3:
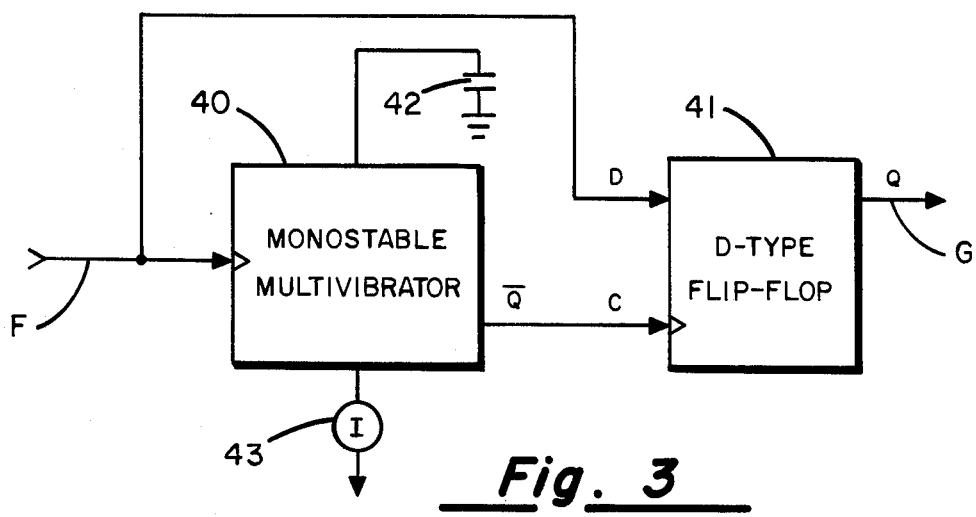
FIG. 3 is a diagram of a logical filter useful in the apparatus shown in FIG. 1.

FIG. 3 is a block diagram of logical filter 28 according to the present invention. Filter 28 comprises a retriggerable monostable multivibrator (one shot) 40 followed by a D-flip-flop 41. The width of the one-shot pulse is determined by the value of capacitor 42 and the current from current source 43. Signal polarity changes in either direction at the input of the filter operate multivibrator 40. If the intervals between polarity changes at the input (waveform F) are larger than the pulse width of multivibrator 40, D-flip-flop 41 will be clocked to the corresponding polarity by the trailing edge of the one-shot pulse (namely, by the positive edge at the Q-not output of multivibrator 40). If, on the other hand, the interval between polarity changes at the input (waveform F) is less than the time-out time of multivibrator 40, the multivibrator will be re-triggered and its time-out time will be started anew by each change in the polarity at its input. Consequently, there will be no clocking edges for the D-flip-flop 41 and it will remain in one state, until an interval, longer than the time-out time of multivibrator 40, occurs between polarity changes at the input of the filter.

Figure 4:
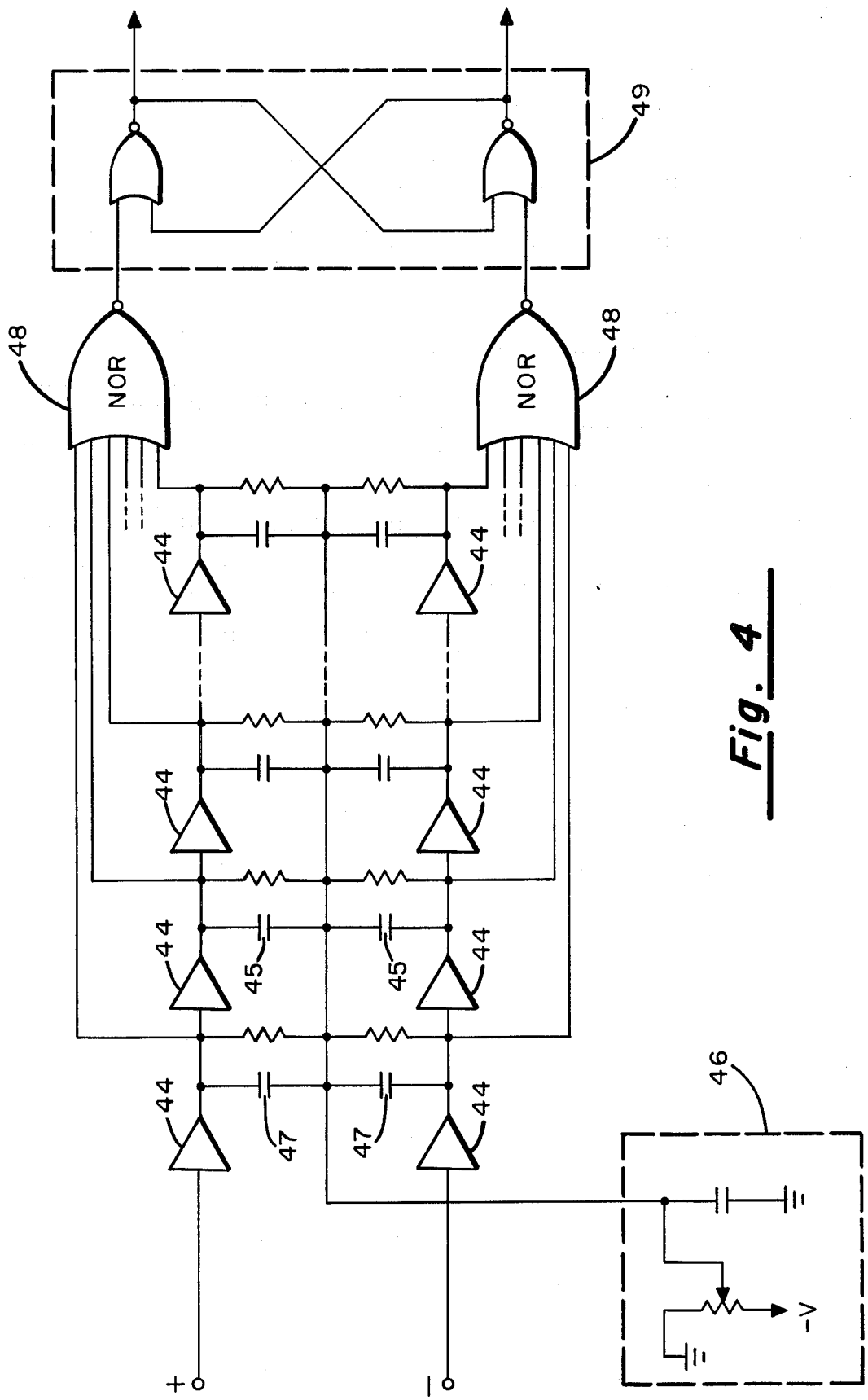
FIG. 4 is a block diagram of a preferred logical filter for use in the circuit of FIG. 1.

FIG. 4 is a detailed schematic of logical filter 28 which is suitable for implementation on an LSI chip employing standard ECL (emitter coupled logic). The logical filter consists of two identical strings of ECL gates or buffers 44, to which the two complimentary logic signals are provided from high resolution comparator 27 (FIG. 1). Buffers 44 are terminated through pulldown resistors 45 and capacitors 47 to variable control voltage source 46. The capacitors 47 are small in value and may be stray (load) capacitors, intentionally installed capacitors, or capacitors of biased p-n junctions of diodes or transistors. The capacitors, together with the voltage value of source 46, adjust the propagation time through buffers 44. Outputs from buffers 44 are supplied to two multi-input NOR gates 48, the outputs of which are supplied to two inputs of latch 49. Outputs of the latch 49 are the outputs of the filter.

Positive and negative going logical signals propagate at different speeds in the logical filter. When the change in logical state occurs at the input of the filter, the signal which has become positive propagates relatively fast through the one side of the filter. At the start of the propagation of a positive going signal, when the first buffer 44 in the chain goes high, output of the corresponding NOR gate 48 goes low and enables the latch 49.

On the other hand, the signal which has become negative propagates through other side of the filter relatively slowly. Only when the last buffer in that chain goes low, does the output of corresponding NOR gate 48 go high and set the R-S latch 49 to the appropriate state.

When time interval between polarity changes at the input of the filter is larger than the propagation time for the negative edge, the filter passes the change in the signal polarity at its input to its output. On the other hand, if the time interval between polarity changes at the input is less than the propagation time for the negative edge, the filter ignores the preceding changes. In such a case, at least one of the buffers 44 at the "negative" side of the filter goes high during the propagation of the previous negative edge. Therefore, the gate 48 collecting signals at this side of the filter does not go high and the state of latch 49 remains unchanged. Thus, only a polarity change that is not followed by another polarity change during the propagation time of the filter appears at its output. Adjustment of the value of control voltage in the source 46 adjusts the time delay of the filter and its rejection interval.

For a given encoded pattern and for a given track radius, the positions of the crossovers at the output of the low resolution filter will vary, producing extensive intersymbol interference in the low resolution channel. Consequently, the delay will be different for different channels. Moreover, as a head is moved from track to track, the shape of the crossover patterns will change with the radius. If this occurs simultaneously with an unusual isolated false crossover in the high resolution channel due to noise, a false detection can occur in the system described in the aforementioned U.S. Pat. No. 4,517,610. Such false detection will not occur with the present invention because a single false crossover in the high resolution channel preceding a true crossover has the wrong polarity to operate validation logic 30. Consequently, the false detection just described is overcome by the present invention.

Another problem of prior dual channel recovery systems resides in the fact that multiple false crossovers due to noise in the high resolution channel can, when occurring with an unusually early crossover in the low resolution channel, cause a false detection. However, the present system eliminates this source of false detection by rejecting multiple closely-spaced false crossovers in logical filter 27.

Hence, the present invention provides for dual channel recovery which is accurate and insensitive to effects as track radius, change in response shape, etc.

FIG. 5 illustrates alternative dual channel readback recovery circuit according to the present invention. Similar elements of this embodiment are identified with the same reference numerals as like elements in FIG. 1. FIG. 6 is a timing diagram for this embodiment. A medium resolution filter 56 is characterized by a moderate intersymbol interference and a moderate noise rejection but better delay matching to the high resolution filter 26 compared to the low resolution filters used in the circuit of FIG. 1. Logical filter 28 is in the medium resolution channel rather than the high, and logic 30 (FIG. 1) is replaced by a single validation D-flip-flop 50. Pulse former 52 drives the C input of flip-flop 50. The positive and negative edge pulse former 54 reacts on signal edges from flip-flop 50 of both polarity. The output of the medium resolution filter 56 can approach (and cross) zero in the intervals between true crossovers. Therefore, the false crossovers can exist at the output of this filter in limited time intervals as shown schematically in waveforms B and D in FIG. 6. Logical filter 28 in the medium resolution channel eliminates the effects of false crossovers as shown schematically in waveform N in FIG. 6.

Another embodiment of dual channel readback recovery circuit according to the present invention is shown in FIG. 7 and employs logic 70 in the high resolution channel and logical filters 28 in both high and low resolution channels. All adjustments of the delays in the channels and of the rejection intervals in logical filters are made adaptively. The reference for adaptation is the external system clock, derived from a phase locked loop (not shown) which tracks media speed and provides a time scale for exchange of information between the storage device and other devices. The process of read signal recovery in this circuit is the same as in the circuits shown in FIGS. 1 and 5 and corresponding units are identified with the same numerals. A controllable ring oscillator 61 includes an active delay ring oscillator 62, a phase-frequency comparator 63, a charge pump 64 and a loop filter 65. The delay elements utilized in the active delay ring oscillator 62 are of the same type used in the logical filter (see FIG. 4). Controllable delay line 70 also is constructed similarly to the logical filter (FIG. 4). By maintaining the proper value of delay in the active delay ring oscillator 62, its frequency is always equal to the frequency of the external clock 66. Any deviations between the two frequencies is detected by the phase-frequency comparator 63 which provides DC output to the charge pump 64 proportional to the phase difference between the two signals. In turn, the charge pump 64 (together with the loop filter 65) provides the control pulldown voltage which is supplied to the terminating resistors of the delay elements. The control voltage corrects the frequency of the active delay oscillator 62. Simultaneously, it corrects all delays in the system.

The delay elements in the active delay ring oscillator 62 are the master delay elements since they provide the control of the frequency of the active delay ring oscillator and the tracking action of the loop. The delay elements in the logical filters 28 and in the controllable delay line 70 are the slave delay elements, since they simply follow the changes in the delays of the master delay elements. The appropriate ratio of the number of slave delay elements to the number of master delay elements is chosen in the system to establish the proper delays in the channels and the proper rejection intervals in the logical filters. During circuit operation all changes in the delays in the system are tied to the changes in the period of reference clock 66, and hence, to the changes in the value of the detection window. Therefore, the optimal conditions for readback signal recovery are always maintained.

The present invention thus provides an effective dual channel recovery system which is insensitive to changes in track position or radius and to delay matching of the channels. The system permits adaptation of delays and rejection intervals to a reference clock. The system is well suited for LSI circuit design.

This invention is not to be limited by the embodiments described in the description or shown in the drawings, which are given by way of example and not of limitation, but only in accordance with the scope of the appended claims.

What is claimed is:

1. A dual channel readback recovery system having a high resolution channel for receiving a read signal and producing high resolution pulse signals representative of digital information contained in said read signal, and having a low resolution channel for receiving said read signal and producing low resolution pulse signals representative of digital information contained in said read signal, said digital information being encoded in a predetermined code characterized in that pulse signals representative of said digital information are spaced at least a predetermined time interval apart, the improvement comprising: logical filter means in at least one of said channels for rejecting pulses spaced less than said time interval; and validation logic means responsive to unrejected high and low resolution pulse signals to recover said digital information.

2. Apparatus according to claim 1 wherein said logical filter means comprises monostable means responsive to edges of pulses recovered from said read signal to set to a first state, timer means responsive to said edges of said pulses for establishing a time period, said time period being restarted by each pulse edge, said monostable means being responsive to said timer means to reset to a second state upon expiration of said time period.

3. Apparatus according to claim 2 further including bistable means responsive to said monostable means to alter the state of said bistable means each time said monostable means resets to its second state.

4. Apparatus according to claim 1 wherein said pulse signals comprises first and second complementary pulse signals, said logical filter means comprising a first plurality of serially-connected gate means responsive to said first pulse signals and a second plurality of serially-connected gate means responsive to said second pulse signals, first collector gate means responsive to each gate means of said first plurality of gate means to set a first gate signal to a first logic level whenever any of said gate means of said first plurality of gate means responds to a pulse of a first polarity and to set said first gate signal to a second logic level whenever all of said gate means of said first plurality of gate means responds to a pulse of a second polarity, second collector gate means responsive to each gate means of said second plurality of gate means to set a second gate signal to a first logic level whenever any of said gate means of said second plurality of gate means responds to a pulse of a first polarity and to set said second gate signal to a second logic level whenever all of said gate means of said second plurality of gate means responds to a pulse of a second polarity; and latch means responsive to said first and second collector gate means to set a pulse whenever either of said first and second collector gate means sets its respective gate signal to said second logic level.

5. Apparatus according to claim 1 wherein said pulse signals comprises first and second complementary pulse signals, said logical filter means comprising: first and second strings of serially-connected logic gates responsive to said first and second pulse signals, respectively; first and second NOR gates having their inputs connected to the outputs of each logic gate of the respective first and second strings; and a latch connected to said first and second NOR gates.

6. Apparatus according to claim 1 wherein said unrejected high and low resolution pulse signals comprise complementary first and second high resolution pulse signals and complementary first and second low resolution pulse signals, respectively; said validation logic means comprising first and second bistable means each having clock and reset inputs, the reset inputs of said first and second bistable means being connected to receive said second and first low resolution pulse signals, respectively, and the clock inputs of said first and second bistable means being connected to receive said first and second high resolution pulse signals, respectively; and pulse forming means responsive to said first and second bistable means to produce a pulse signal representative of said digital information.

7. Apparatus according to claim 6 wherein said logical filter means comprises monostable means responsive to edges of pulses recovered from said read signal to set to a first state, timer means responsive to said edges of said pulses for establishing a time period, said time period being restarted by each pulse edge, said monostable means being responsive to said timer means to reset to a second state upon expiration of said time period.

8. Apparatus according to claim 7 further including bistable means responsive to said monostable means to alter the state of said bistable means each time said monostable means resets to its second state.

9. Apparatus according to claim 6 wherein said pulse signals comprises first and second complementary pulse signals, said logical filter means comprising a first plurality of serially-connected gate means responsive to said first pulse signals and a second plurality of serially-connected gate means responsive to said second pulse signals, first collector gate means responsive to each gate means of said first plurality of gate means to set a first gate signal to a first logic level whenever any of said gate means of said first plurality of gate means responds to a pulse of a first polarity and to set said first gate signal to a second logic level whenever all of said gate means of said first plurality of gate means responds to a pulse of a second polarity, second collector gate means responsive to each gate means of said second plurality of gate means to set a second gate signal to a first logic level whenever any of said gate means of said second plurality of gate means responds to a pulse of a first polarity and to set said second gate signal to a second logic level whenever all of said gate means of said second plurality of gate means responds to a pulse of a second polarity; and latch means responsive to said first and second collector gate means to set a pulse whenever either of said first and second collector gate means sets its respective gate signal to said second logic level.

10. Apparatus according to claim 6 wherein said pulse signals comprises first and second complementary pulse signals, said logical filter means comprising: first and second strings of serially-connected logic gates responsive to said first and second pulse signals, respectively; first and second NOR gates having their inputs connected to the outputs of each logic gate of the respective first and second strings; and a latch connected to said first and second NOR gates.

11. Apparatus according to claim 1 wherein said unrejected high and low resolution pulse signals comprise complementary first and second high resolution pulse signals and first and second low resolution pulse signals, respectively; said validation logic means comprises first and second D-flip-flops having their reset inputs connected to receive said second and first low resolution pulse signals, respectively, and having their clock inputs connected to receive said first and second high resolution pulse signals, respectively; and an OR gate having its inputs connected to the output of said first and second D-flip-flops; and a positive edge pulse former connected to the output of said OR gate.

12. Apparatus according to claim 1 wherein said validation logic means comprises bistable means having a clock input connected to receive said unrejected high resolution pulse signals and a data input connected to receive said unrejected low resolution pulse signals, and pulse former means responsive to setting and resetting of said bistable means to produce a pulse signal representative of said digital information.

13. Apparatus according to claim 12 wherein said logical filter means is in said low resolution channel.

14. Apparatus according to claim 1 further including control means for controlling signal delays in said logical filter means, said control means comprising ring oscillator means responsive to a system clock signal.

15. Apparatus according to claim 14 further including variable delay means in one of said channels responsive to said control means for synchronizing the propagation time of the two channels.

16. Apparatus according to claim 14 wherein said control means further includes phase compare means responsive to said system clock signal and to said ring oscillator means for determining phase/frequency difference, pump means responsive to said phase compare means providing a signal representative of said phase/frequency difference, said oscillator means being responsive to said pump means to provide a signal phase and frequency locked to said clock signal.

* * * * *